United States Patent Office 2,848,373
Patented Aug. 19, 1958

2,848,373

COPPER CHLORIDE SWEETENING

Russell H. Brown and William P. Fairchild, Hammond, Ind., and Fred K. Kawahara, Chicago, Ill., assignors to Standard Oil Company, Chicago, Ill., a corporation of Indiana No Drawing. Application February 25, 1955
Serial No. 490,684

4 Claims. (Cl. 196—29)

This invention relates to the sweetening of sour petroleum distillates by the copper chloride process. More particularly it concerns a particular catalyst suitable for use in copper chloride sweetening.

The so-called copper chloride sweetening process has attained wide use in the petroleum industry for the sweetening of sour virgin naphthas. In this process, the sour naphtha is passed through a fixed bed of catalyst or contacted with a dispersion of catalyst particles in the presence of free-oxygen until the mercaptans in the naphtha have been converted to disulfides. The catalyst conventionally used consists of copper chloride and water supported on an adsorbent material such as fuller's earth. The copper chloride sweetening process is usable on thermally cracked naphthas. However, when operating on thermally cracked sour naphthas, generally the catalyst life is very short owing to loss of catalyst in the sweet oil. The presence of copper in the sweet oil is very detrimental to the color stability of the sweet oil. When the copper chloride process is used for the sweetening of distillate fuels having a high total sulfur content, the sweet oil is extremely unstable and cannot be stabilized by the introduction of even massive doses of copper metal deactivator.

An object of the invention is an improved catalyst for use in copper chloride sweetening processes. Another object is a copper chloride sweetening process suitable for operation on sour cracked distillates and sour distillate fuels without excess loss of copper from the catalyst. Still another object is a copper chloride sweetening process wherein color-stable sweet oils are produced from high sulfur content distillate fuels. Other objects will become apparent in the course of the detailed description.

The improved catalyst consists of between about 35 and 45 weight percent of water, between about 4 and 15 weight percent of cupric chloride and the remainder essentially all fuller's earth, which catalyst is prepared by dissolving the required amount of cupric chloride in liquid water and adding the cupric chloride solution to the required amount of granular fuller's earth. Fuller's earth generally contains some adsorbed water and the amount of liquid water used is adjusted to meet the total requirement of water, including that adsorbed on the fuller's earth.

The fuller's earth utilized may be any adsorbent clay either in the natural state or acid treated form. A particularly suitable earth is Attapulgus clay. When operating in the so-called slurry type of sweetening, the fuller's earth generally is of a screen size smaller than about 80 mesh; usually the clay will have a screen size between 80 mesh and 200 mesh. Coarser grains are used when preparing catalyst for a fixed bed type operation.

The cupric chloride which is the active catalyst may be either the commercial grade material or C. P. material. It may be used either in the anhydrous form or in the hydrate form. Or the cupric chloride may be obtained by the reaction of cupric sulfate and ammonium chloride or sodium chloride by dissolving these materials in the liquid water needed for the preparation of the catalyst.

The catalyst contains between about 35 and about 45 weight percent of water based on the total catalyst mass. Cupric chloride is present in an amount between about 4 and about 15 weight percent of the total catalyst mass. The carrier for the water and cupric chloride is a fuller's earth. The amount of cupric chloride may be more or less than the above amounts. It is preferred to have between about 5 and 8 weight percent of cupric chloride in the catalyst. It is preferred to have about 40 weight percent of water in the catalyst.

In addition to the particular composition, the method of preparing the catalyst is important for the successful operation of the sweetening process of the invention. The catalyst is prepared by dissolving the cupric chloride in liquid water at ordinary atmospheric temperatures and adding this solution to the required amount of fuller's earth. The amount of water normally adsorbed on fuller's earth is taken into account in determining the amount of liquid water needed in preparing the solution. A catalyst prepared by preforming the cupric chloride-water solution and adding the solution to the fuller's earth is a free-flowing granular mass which appears to be "dry" to the senses.

Under the conventional conditions of operation of the copper chloride sweetening process, the use of the above described catalyst with certain sour distillates, hereinafter defined, results in a remarkable decrease in loss of copper from the catalyst and, with certain distillates, a remarkable improvement in color stability of the sweet oil.

The distillates which are charged to the process of this invention are (a) thermally cracked distillates boiling in the range of about 100° F. to about 600° F., (b) virgin distillates boiling in the range of about 100° F. to about 600° F. which contain appreciable amounts of thermally cracked distillates as defined above, and (c) high sulfur content virgin distillates boiling in the range of about 325° F. and about 600° F. The thermally cracked distillates may be either naphthas or heavier-than-gasoline boiling range oils commonly known as cycle stocks. It has been found that the presence of appreciable amounts of these cracked distillates in admixture with virgin distillates causes large losses of copper from the catalyst and also color instability when these are sweetened by the conventional types of copper chloride sweetening catalyst. As little as 5 volume percent, or in some cases less, of cracked distillate in admixture with virgin distillate will have a definite deleterious effect. The high sulfur content virgin distillates generally contain at least 0.3 weight percent of total sulfur. These distillates may be described as virgin distillate fuels and boil in the range of about 325° F. and 600° F. When a sweet virgin distillate of excellent color stability is desired, the sulfur content of the feed distillate should be in the range of 0.3 and 1.2 weight percent and the mercaptan number of the feed distillate should be not more than 40. Mercaptan number is the number of milligrams of mercaptan sulfur present in 100 ml. of the sour oil. The highest quality distillate fuels suitable for use as heater oils boil over the range between about 325° F. and about 550° F.

Our studies have led us to believe that the loss of copper from the catalyst and the instability of the sweet oil are due to the formation of oil-soluble copper phenolates or the like. Virgin naphthas and low sulfur virgin distillate fuels are essentially free of oxygenated polar compounds, such as phenol and alkylphenols. On the other hand, all distillates derived from the thermal cracking operation are known to contain appreciable amounts, and frequently large amounts, of oxygenated polar compounds frequently designated as petroleum cresols. It is also known that virgin distillates from high sulfur crudes usually contain appreciable amounts of oxygenated polar compounds. In general, a distillate having a sulfur content in excess of 0.3 weight percent will contain sufficient oxygenated polar compounds to result in color instability after copper chloride sweetening by conventional catalyst. In general, the sulfur content and mercaptan content of the virgin distillates as produced from the fractionator are indicative of the phenol content. When maximum color stability of the sweet virgin distillate is desired, the maximum mercaptan number should be 40.

Some refinery treating operations remove mercaptans from the virgin distillate without any substantial decrease in oxygenated polar compound content. For example, a heater oil distillate having a total sulfur content of 1.1 weight percent, a mercaptan number of 90 and a phenol content of about 0.3 volume percent when treated with 30 weight percent aqueous caustic solution is decreased in mercaptan number by 20 or 30 units without any appreciable removal of phenols. On the other hand, treatment of this same distillate with aqueous methanol-KOH solution containing about 50 weight percent of KOH produced a substantially sweet distillate which is also substantially free of phenols. Still another method of treating is with sulfuric acid. When the West Texas heater oil distillate described above is treated with about 5 pounds of 92% sulfuric acid per barrel of distillate, a product oil having a mercaptan number of 5–10 is obtained, which oil cannot be copper sweetened using conventional catalyst without prohibitive loss of copper and wholly unsatisfactory color stability. Thus the process of the invention is directed to those petroleum distillates which contain amounts of oxygenated polar compounds, such as phenols, such that they cannot be sweentened using the conventional copper chloride catalysts in a copper chloride sweetening operation without large losses of copper from the catalyst and unsatisfactory color stability of the sweet oil. In general, the conventional copper chloride catalyst consists of between about 1 and 25 weight percent of cupric chloride, between about 5 and 30 weight percent of water and the remainder substantially all fuller's earth or pumice.

The results obtainable with the catalyst of this invention and with the copper chloride sweetening process of this invention are illustrated by the working examples set out below. In these tests, a bench scale continuous copper chloride sweetening unit was used. This unit contained a preheater maintained at about 95° F. for saturating the sour oil with water, a reactor wherein the sour oil was contacted with a slurry of granular catalyst at a temperature of about 100° in the presence of free-oxygen, the free-oxygen content being somewhat in excess of that theoretically required to convert all the mercaptans to disulfides. Means were provided for withdrawing a slurry of catalyst and oil from the reactor and mixing this slurry with sour oil much in the manner utilized in commercial slurry type sweetening units. The sweet oil was withdrawn continuously from the reactor and given a water wash to remove entrained catalyst, in order to produce the so-called product oil. In all cases, the sour oil was contacted with aqueous caustic solution—usually two treats with 5 volume percent of 20% sodium hydroxide solution to remove hydrogen sulfide. The hydrogen sulfide-free oil was water washed to remove aqueous caustic which is harmful to the copper chloride catalyst.

When a phenol-containing oil was being sweetened with conventional catalyst, a yellowish precipitate was obtained during the water washing operation. The precipitate appeared as a scum at the interface of the sweet oil and water layers. This yellowish precipitate analyzed as copper salt of an oxygenated polar compound believed to be alkylphenols.

In order to determine the amount of copper removed from the catalyst, the reactor effluent and the product oil were analyzed for oil-soluble copper. A sample of reactor effluent, without water washing, was passed through filter paper granules to remove entrained catalyst. A sample of the water washed oil was passed through filter paper to remove water. The oil samples were then analyzed for soluble copper and the copper content was determined as parts per million (p. p. m.) as copper metal.

TEST 1

In this test, the sour oil was a blend of heater oil distillate derived by distillation from a low sulfur Mid-Continent crude—70%; a high sulfur heater oil distillate derived by distillation from a West Texas crude—11%, and a virgin very heavy naphtha which contained a small amount of cracked naphtha—19%. The mercaptan number of this blend was 22.6 and the total sulfur content was about 0.3 weight percent.

In this test, the method of preparation of catalyst was studied and compared with a conventional copper chloride catalyst utilized in large scale operations. The various catalysts were prepared as follows:

*Method A.*—One gram of cupric chloride dihydrate was dissolved in 4 grams of water. This solution was added to 9 grams of Attapulgus clay fines. The clay had been analyzed as containing 15 weight percent of water of adsorption. The solution and the clay were mixed until a free-flowing mass which appeared "dry" to the eye and the touch was obtained.

*Method B.*—Four grams of liquid water were added to 9 grams of Attapulgus clay fines as used in Method A. The water and the clay were mixed until the water was completely adsorbed. Then one gram of cupric chloride dihydrate was added to the water-containing clay. The mixing was continued until all the cupric chloride had passed into the clay and a free-flowing dry mass was obtained.

*Method C.*—One gram of cupric chloride dihydrate was added to 9 grams of Attapulgus clay fines of the type used in Method A. These were thoroughly intermingled and then 4 grams of water was added to the mixture. The mixing was continued until a free-flowing granular mass was obtained.

*Method D.*—A conventional copper chloride catalyst as utilized in refining operations was obtained. This catalyst contained 18% of water, 8% of cupric chloride and the remainder Attapulgus clay fines.

The sour oil described above was contacted with each of the various catalysts and the reactor effluent was filtered through filter paper to remove entrained catalyst. In each case, the reactor effluent was sweet to the doctor test. The copper content of the filtered reactor effluent was determined as parts per million of copper. The color stability of the filtered sweet reactor effluent was determined after adding to the oil 0.001 weight percent of copper metal deactivator, N,N' disalicylidine-1,2-diaminopropane. This corresponds to 2 pounds of meal deactivator per 1000 barrels of sweet oil, which is the usual dosage for commercial oils. The Saybolt color of the filtered reactor effluent was measured and then the oil was aged in an accelerated test. In this test, 100 ml. of the oil is maintained in an open beaker for 20 hours at 200° F. The "aged color" in conjunction with the initial color is considered a good measure of the storage stability of the particular oil. The greater the difference between the initial color and the aged color, the worse the color stability of the oil in commercial storage.

The results of this test are set out in Table I below.

*Table I*

| Method of Preparation | Filtered Oil [1] Color, Saybolt | | Filtered Oil Copper Content, p. p. m. |
|---|---|---|---|
| | Initial | Aged | |
| A | +13 | +13 | 0.3 |
| B | +18 | (2) | 3.5 |
| C | +8 | (2) | 4.4 |
| D | +15 | −12 | 3.0 |

[1] All oils sweet to doctor test.
[2] Darker than −16 Saybolt.

It is readily seen that only the catalyst of Method A, which is the catalyst of this invention, produced an oil of satisfactory color stability. Furthermore, the reactor effluent produced using the catalyst of this invention contained less than 10% of the dissolved copper than was contained in the reactor effluents utilizing either conventional catalyst or high water content catalysts made by different methods.

TEST 2a

In this test, the sour oil was a virgin very heavy naphtha which was contaminated with appreciable amounts of cracked stock. This sour feed boiled over the range of 350° F. to 450° F. and contained 0.15 weight percent of total sulfur. In this test, the catalyst used was prepared by the method of this invention as shown in Method A of Test 1. This catalyst contained 39.9 weight percent of water, 5.6 weight percent of cupric chloride, and 54.5 weight percent of Attapulgus clay fines. In this test, the reactor effluent was washed four times. The first two washes were carried out at a temperature of 110° F. utilizing one volume of liquid hot water for 2 volumes of distillate in each washing stage, i. e., 1 volume of liquid hot water was used per volume of oil in the so-called hot water washing steps. The hot-water-washed oil was then washed twice using 1 volume of water for 2 volumes of oil; the temperature of the third and fourth washing steps was 60° F. Paper filtered reactor effluent and paper filtered washed oil were analyzed for soluble copper content and were also subjected to the accelerated aging test. In this test, the catalyst was contacted with a total of 13 quarts of sour oil and the product oil was collected as 13 separate quart fractions. Each fraction was analyzed for soluble copper content as reactor effluent and washed product oil and the product oil was given the accelerated aging test. In Table 2a below are given the results on the fourth quart, the eighth quart, and the tenth quart from the reactor.

*Table 2a*

| Fraction | Product Oil[1] Color, Saybolt | | Copper Content, p. p. m. | |
|---|---|---|---|---|
| | Initial | Aged | Reactor Effluent | Product Oil |
| 4 | +23 | +16 | 0.1 | 0.1 |
| 8 | +23 | +18 | 0.3 | 0.3 |
| 10 | +23 | +18 | | |

[1] Sweet to doctor test.

TEST 2b

In this test, the feed described in Test 2a was sweetened using a conventional type copper chloride catalyst. This catalyst was prepared by mixing one gram of cupric chloride dihydrate with 9 grams of Attapulgus clay fines containing 15 weight percent of adsorbed water. This catalyst analyzed: Water, 15.6 weight percent, cupric chloride, 7.9 weight percent, and Attapulgus clay fines, 76.5 weight percent. The sour oil was contacted with this catalyst under the conditions previously described in Test 2a. The fourth, eighth and tenth quart fractions were tested as described in Test 2a and the results are set out in Table 2b below.

*Table 2b*

| Fraction | Product Oil[1] Color, Saybolt | | Copper Content, p. p. m. | |
|---|---|---|---|---|
| | Initial | Aged | Reactor Effluent | Product Oil |
| 4 | +20 | +15 | 4.4 | 0.4 |
| 8 | +20 | +17 | 4.3 | 0.4 |
| 10 | +16 | +10 | | |

[1] Sweet to doctor test.

The tremendous difference in copper carryover in the reactor effluent as dissolved copper is apparent by a comparison of Tables 2a and 2b. By the use of the catalyst of this invention, the copper loss is reduced to about one-fourteenth that utilized in the conventional type catalyst. The product oil, utilizing the catalyst of Test 2a, shows a color stability which is quite satisfactory. The fourth and eighth fractions produced by the catalyst used in Test 2b are satisfactory. However, the tenth quart shows a very sharp drop in color stability which is believed to be the result of the drastic change in catalyst composition owing to the loss of copper therefrom. These data clearly show the superiority of the catalyst of this invention over the conventional type catalyst in the sweetening of a virgin distillate containing only a small amount of cracked stock, believed to be between 5 and 10%.

TEST 3a

In this test, the feed was an acid treated high sulfur heater oil distillate which boiled over the range of 320° F. and 560° F. and had a sulfur content of 0.6 weight percent. The mercaptan number was 7. This feed had been obtained by acid treatment of a raw West Texas heater oil distillate having a mercaptan number of 90 and about the same sulfur content. The acid treatment consisted of a first stage contact with sludge obtained from the second stage; and a second stage treatment with 5 pounds of 92% acid per barrel of distillate. The treated distillate was settled to remove sludge which was then recycled to the first stage. Pepper sludge was removed from the distillate by coalescing, utilizing a steel wool packed coalescer. The coalescer effluent was neutralized with aqueous caustic solution and water washed to remove entrained aqueous caustic.

In this test, the influence of the water washing technique was studied utilizing the catalyst of this invention as prepared in Test 1 by Method A.

*Run 1.*—In this run, the reactor effluent was filtered to remove entrained catalyst and was then analyzed for copper content and given the accelerated aging test without any water washing.

*Run 2.*—In this run, the reactor effluent was water washed according to the four-stage operation described in Test 2a. The first two stages were maintained at 108° F. and the second two stages were maintained at 63° F.

*Run 3.*—In this run, the reactor effluent was given a single water washing at 110° F. using 10% of water based on the oil.

*Run 4.*—In this run, the reactor effluent was given a single washing at 34° F. using 10% of water based on oil. The results of these runs are set out in Table 3a below.

*Table 3a*

| Run | Product Oil Color, Saybolt | | Copper Content, p. p. m. | |
|---|---|---|---|---|
| | Initial | Aged | Reactor Effluent | Product Oil |
| 1 | +20 | +18 | 0.5 | 0.5 |
| 2 | +20 | +20 | 0.5 | 0.5 |
| 3 | +19 | +17 | | 0.5 |
| 4 | +18 | +16 | | 0.5 |

The data show that within the error of the test procedure, the water washing technique had no influence on the color stability of the sweet oil.

TEST 3b

Utilizing the feed described in Test 3a and the conventional catalyst described in Test 2b, runs were made to determine the effect of water washing technique on the color stability of sweet oils.

*Run 5.*—In this run, the reactor effluent was washed according to the procedure described in Test 2a. The first two stages were carried out at 110° F. and the second two stages were carried out at 60° F.

*Run 6.*—In this run, the reactor effluent was given a single washing at 105° F. using 20% of water based on oil.

*Run 7.*—In this run, the reactor effluent was given a single washing at 34° F. using 10% of water based on oil.

*Table 3b*

| Run | Product Oil Color, Saybolt | | Copper Content, p. p. m. | |
|---|---|---|---|---|
| | Initial | Aged | Reactor Effluent | Product Oil |
| 5 | +16 | +14 | 2.7 | 0.4 |
| 6 | +13 | +10 | | 0.4 |
| 7 | −7 | (¹) | | |

¹ Off Saybolt scale—less than −16.

The data presented in Test 3b show that the water washing technique has a great effect on the color stability of sweet oil derived from a conventional catalyst type sweetening. The hot water washing produced an oil of satisfactory color stability. The cold washed oil was completely unsatisfactory. Since the heating of water may be a considerable expense, it is apparent that the process utilizing the catalyst of this invention has a large economic advantage over the process using conventional catalysts, in that the process of this invention does not need to use heated water and may use water at whatever temperature it is available. Run 4, Table 3a, shows that water at ice temperature may be used without any adverse effect when the catalyst made by the method of this invention is utilized in the sweetening operation.

TEST 4a

In this test, a 50:50 blend, of a low sulfur content mid-continent heater oil distillate and a high sulfur content West Texas heater oil distillate, having a mercaptan number of 30 was charged to the process. This distillate had received no prior treatment of any kind subsequent to production from the fractionators and the blending operation. According to the procedure of Test 2a, the sour oil was sweetened utilizing the catalyst prepared by Method A of Test 1. The fourth, eighth and tenth quart through the reactor were analyzed for copper content and color stability. The results of this test are set out in Table 4a below.

*Table 4a*

| Fraction | Product Oil¹ Color, Saybolt | | Copper Content, p. p. m. | |
|---|---|---|---|---|
| | Initial | Aged | Reactor Effluent | Product Oil |
| 4 | +29 | +23 | 0.6 | 0.2 |
| 8 | +27 | +23 | 0.5 | 0.2 |
| 10 | +27 | +21 | 0.6 | 0.2 |

¹ Sweet to doctor test.

TEST 4b

Using the feed described in Test 4a, oil was sweetened using the conventional type catalyst described in Test 2b. The fourth, eighth, and ninth quart fractions were analyzed for copper content and color stability. The results of these tests are set out in Table 4b below.

*Table 4b*

| Fraction | Product Oil¹ Color, Saybolt | | Copper Content, p. p. m. | |
|---|---|---|---|---|
| | Initial | Aged | Reactor Effluent | Product Oil |
| 4 | +1 | ²−7 | 9.2 | 0.8 |
| 8 | −6 | ²−1 | 4.4 | 0.4 |
| 9 | (³) | ²−2 | 5.1 | 0.4 |

¹ Sour to doctor test (RSH No. 1+).
² Considerable volume of fine, black sediment formed.
³ Darker than −30.

First it is noted that this oil was not sweetened when utilizing conventional type catalyst. Secondly, the copper carryover in Test 4b was 8 to 15 times as great as that in Test 4a. Lastly, not only the aged color, but also the initial color of the conventional catalyst "sweetened" oil was wholly unsatisfactory. In the oils from Test 4b, a fine black sediment was formed whereas the oils from Test 4a were clear and completely free of sediment. This test shows a remarkable ability of the catalyst of this invention to sweeten a very high sulfur, high mercaptan number distillate fuel with only slight loss of copper from the catalyst and producing an oil of completely satisfactory color stability.

Although in each of the tests carried out above the product oil or filtered reactor effluent was stabilized by the addition of N,N' disalicylidine-1,2-diaminopropane, it is to be understood that the beneficial results obtainable by the catalyst of our invention with respect to reduction in copper carryover is not related to the use of metal deactivator. Obviously the beneficial results with respect to color stability are comparatively as good or better in favor of the oil from the process using the catalyst of the invention as compared to oil from the conventional type process, in the absence of copper metal deactivator. Any of the copper metal deactivators which are known to this art might be added to the sweet oil. Numerous examples of copper metal deactivators known to the art are given in Industrial and Engineering Chemistry 41, 918 (May 1949).

It is to be understood that the term "copper chloride sweetening conditions" is intended to include all of the conditions known to the art in the treating of sour distillates using supported copper chloride catalyst. Numerous patterns and publications have described a great number of variations on the basic copper chloride sweetening process as developed by Hoover. These conditions concern the pretreatment of the sour distillate, the conditions of time, temperature and oxygen usage in the sweetening reactor and the techniques used to remove entrained catalyst from the reactor effluent.

Thus having described the invention, what is claimed is:

1. A process for sweetening a sour petroleum distillate selected from the class consisting of (a) thermally cracked distillates boiling in the range of about 100° F. to about 600° F., (b) virgin distillates boiling in the range of about 100° F. to about 600° F. which contain appreciable amounts of said thermally cracked distillate and (c) high sulfur content virgin distillates boiling in the range of about 325° and about 600° F., by contacting said distillate, in the presence of free-oxygen in the amount at least theoretically needed to sweeten said distillate, under copper chloride sweetening conditions in the presence of a catalytically effective amount of a copper chloride sweetening catalyst consisting of between about 35 to 45 weight percent of water, between about 4 and 15 weight percent of cupric chloride and the remainder essentially all fuller's earth, said catalyst being prepared by dissolving the required amount of cupric chloride in liquid water sufficient to produce in conjunction with water absorbed on said earth the desired water content catalyst and adding said solution to the required amount of granular fuller's earth.

2. The catalyst of claim 1 wherein water is about 40 weight percent, cupric chloride is about 6 weight percent and the remainder is essentially granular fuller's earth.

3. The catalyst of claim 1 wherein said earth is Attapulgus clay having a screen size smaller than about 80 mesh.

4. The process of claim 1 wherein said sour distillate is a virgin heater oil distillate boiling over the range between 325° F. and about 550° F., having a total sulfur content in the range of 0.3 and 1.2 weight percent and having a mercaptan number of not more than 40.

References Cited in the file of this patent

UNITED STATES PATENTS

| | | |
|---|---|---|
| Re. 20,938 | Hoover | Dec. 6, 1938 |
| 2,111,487 | Chaney et al. | Mar. 15, 1938 |
| 2,695,263 | Krause | Nov. 23, 1954 |